US008935331B2

(12) United States Patent
Li

(10) Patent No.: US 8,935,331 B2
(45) Date of Patent: Jan. 13, 2015

(54) FRIEND MATCHING AND MEETING-UP MANAGEMENT SYSTEM AND ITS OPERATION METHOD

(71) Applicant: Shu Lam Li, Kowloon Tong (HK)

(72) Inventor: Shu Lam Li, Kowloon Tong (HK)

(*) Notice: Subject to any disclaimer, the term of this patent is extended or adjusted under 35 U.S.C. 154(b) by 304 days.

(21) Appl. No.: 13/674,316

(22) Filed: Nov. 12, 2012

(65) Prior Publication Data
US 2014/0136631 A1 May 15, 2014

(51) Int. Cl.
*G06F 15/16* (2006.01)
*G06Q 50/00* (2012.01)
*H04L 12/18* (2006.01)
*G06F 12/00* (2006.01)

(52) U.S. Cl.
CPC ............... *G06Q 50/01* (2013.01); *H04L 12/18* (2013.01)
USPC .......................................... 709/204; 709/206

(58) Field of Classification Search
USPC .......................... 709/204–207, 223–229, 250
See application file for complete search history.

(56) References Cited

U.S. PATENT DOCUMENTS

| 6,378,771 B1* | 4/2002 | Cooper ........................ 235/382 |
| 2007/0073803 A1* | 3/2007 | Terrill et al. .................. 709/203 |
| 2007/0255786 A1* | 11/2007 | Mock et al. ................... 709/204 |
| 2011/0161130 A1* | 6/2011 | Whalin et al. ................ 705/7.18 |
| 2011/0257881 A1* | 10/2011 | Chen et al. .................... 701/204 |
| 2011/0320375 A1* | 12/2011 | Zrike et al. .................... 705/319 |
| 2012/0311460 A1* | 12/2012 | Boyd ............................. 715/752 |

FOREIGN PATENT DOCUMENTS

| CN | 1740809 A | 3/2006 |
| CN | 101171875 A | 4/2008 |
| CN | 101281632 A | 10/2008 |
| CN | 101359388 A | 2/2009 |
| CN | 102510382 A | 6/2012 |
| CN | 102654876 A | 9/2012 |

* cited by examiner

*Primary Examiner* — Zarni Maung
(74) *Attorney, Agent, or Firm* — Wendy K. Marsh

(57) ABSTRACT

This invention relates to information science, and discloses a friend matching and meeting-up management system and its operation method. In this invention, a meeting check-in portion of the friend matching and meeting-up management system includes a meeting site portion and a meeting confirming portion. In the whole meeting check-in process, users utilize communicators to communicate with a system manager, and the system manager assists and manages the meeting process of the users expecting to meet after the object is determined. It has higher safety, helps ensure that users meet successfully, and saves a lot of people and material resources. In this invention, the check-in function is formed by combining positioning technology and information transmitting technology based on smart phones and mobile communication technology, or the Internet and wireless technology, which brings people together to meet in person, beyond the virtual world, breaks down barriers and narrows the distance between people.

20 Claims, 9 Drawing Sheets

FRIEND MATCHING AND MEETING-UP MANAGEMENT SYSTEM AND ITS OPERATION METHOD

FIELD OF THE INVENTION

The invention relates to information science, particularly, relates to a friend matching and meeting-up management system.

BACKGROUND OF THE INVENTION

There are various friend matching systems in the cyber world, such as the Internet, the smart mobile phone network etc. For example, some friend matching systems can be found in the portals, such as MSN, Yahoo etc. In these friend matching systems, a user A could fill his/her qualities and conditions, and select requirements for the object expected to contact. Then the friend matching system will select a plurality of other users, such as users B, C, D etc, from all the users of the system according to the selection requirements of the user A. Said user A could further acquire information about these users B, C, D etc, including their contact methods such as email address etc, and select one most suitable or several other users thereof, or change the requirements to make selection for making friends once more. When the user A determines and confirms the object expected to contact, such as the user B, the friend matching system usually will transmit the user A's information, e.g. contact methods such as email address etc, and the request for making friends to the user B. If the user B also agrees on making friend, the users A and B can further contact with each other through contact methods in the friend matching system, such as email address etc, and determine how to meet up themselves.

The world's most successful social networks, such as Facebook and Twitter, have changed the way we interact with friends in this world, but they seem to lack the most crucial step of bringing people together to meet in person from the online space. This is, of course, a step with considerable difficulties, as people have constraints in terms of time and place. Further, the expectations and level of trust differ. To implement this final step of "meeting" into creations is a hard nut to crack.

The inventor discovers that the deficiencies for these friend matching systems of the prior art are as the following. The safety of these friend matching systems is low, e.g., when the user B is in the unknown state, the user A could obtain the contact methods of the user B. Because there are too many users in the cyber world and it is hard to determine each user's quality, if the user's contact methods are known by unfamiliar users, it will probably have risk of being deceived or disturbed. In addition, what is more important is that the friend matching systems of the prior art themselves do not possess the function of arranging for users' meeting, and users should contact with each other about meeting themselves. Also the friend matching systems of the prior art could not supervise whether users really meet or not.

In the Chinese patent with the application number 200810134875.5, a system that a member want to meet or have a blind date with another member in the friend matching network and they finally meet or have a blind date in reality is disclosed. But during the whole process of members' meeting or blind date, the network party connects and makes arrangement for both member parties and keeps company with the members' meeting or blind date all the way, which will consume a lot of people and material resources.

SUMMARY OF THE INVENTION

In view of this, a friend matching and meeting-up management system and its operation method is provided in this invention, which has higher safety, helps ensure that users can meet successfully, and saves a lot of people and material resources.

To solve the above technical problems, the embodiments of this invention disclose a friend matching and meeting-up management system, including a user registering portion, a friend selecting portion, a meeting check-in portion and a system manager, wherein the system manager controls and manages various portions to implement a friend matching and meeting-up management process, and the meeting check-in portion comprises:

a meeting site portion, through which the system manager supervises and manages that at least two users arrive at their meeting site, and communicates with the users by communicators;

a meeting confirming portion, enabling at least two users to utilize the communicators to make meeting confirmation to the system manager. The embodiments of this invention also disclose an operation method for the friend matching and meeting-up management system, wherein the operation method comprises the following steps:

user register step, in which users enter various information via a user register portion to a system manager and register;

friend selection step, in which via a friend selecting portion, the registered users input requirements for the expected object to the system manager, then the system manager chooses one or several users for the registered users to select or confirm until at least two users agree on making friends with each other;

meeting site step, in which via a meeting site portion, the system manager supervises and manages that at least two users arrive at their meeting site, and communicates with the users by communicators;

meeting confirming step, in which said at least two users utilize the communicators to make meeting confirmation to the system manager via a meeting confirming portion.

Comparing the embodiments of this invention with prior arts, the main distinctions and their effects are:

The users expecting to meet contact through the friend matching and meeting-up management system without the risk of disclosing their contact methods before meeting, and the whole meeting check-in process also does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

Further, in convenience of finding the other party, a chat block is applied when users check in, which helps discover the other party in time at the meeting site so that the users can meet successfully.

Further, because communicators are widely installed with software applications of scanning, sending QR Codes, it is convenient and fast to utilize QR Codes as transmitted information to implement the meeting confirming process.

Further, while the system manager utilizes GPS positioning technology, the range of application will be as wide as GPS, i.e. anywhere in the world. Anyone who possesses a communicator equipped with the GPS positioning device and wants to meet new people will be a target client. The service will not have any time or place constraints.

Further, any person who possesses a mobile communicator can participate, and as long as the personal timetable, background and expectation for the object are input, the friend matching and meeting-up management system will send invitation and require confirmation according to match results, which is convenient and fast.

Further, the check-in function is formed by combining positioning technology and information transmitting technology based on smart phones and mobile communication technology, or based on the Internet and wireless technology, which brings people together to meet in person, beyond the virtual world, breaks down barriers and narrows the distance between people.

DETAILED DESCRIPTION OF THE PREFERRED EMBODIMENTS

In the following description, many technical details are provided for readers to understand the application better. However, it is understood to those skilled in the art that the technical solution claimed to be protected by those Claims of this application can also be realized even without these technical details and not based on various changes and amendments of the following embodiments.

For the purpose, technical solution and merits of this invention to be clearer, the following will further describe the embodiments of this invention in detail with reference to the accompanying drawings.

Figure 1:
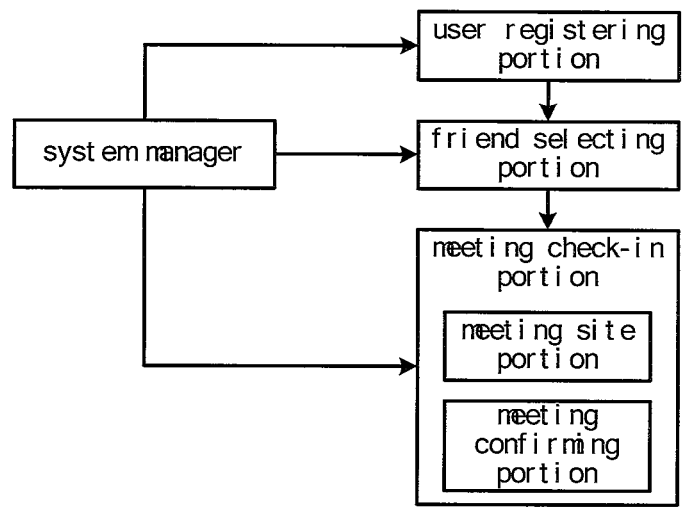
FIG. 1 is a schematic structure diagram of a friend matching and meeting-up management system in the first embodiment of the invention.

The first embodiment of this invention relates to a friend matching and meeting-up management system. FIG. 1 is a schematic structure diagram of the friend matching and meeting-up management system. The friend matching and meeting-up management system includes a user registering portion, a friend selecting portion, a meeting check-in portion and a system manager, wherein the system manager controls and manages various portions to implement a friend matching and meeting-up management process.

In the user registering portion, users can enter various information such as his/her user name, interests, qualities etc, which is similar to the user registering process for the friend matching systems of the prior art. It should be noted that contact methods, such as email address or telephone number etc, registered by the user can be public between the system of this invention and the user and will not be disclosed to any other user before the user's confirmation, or it is set that those contact methods can not be disclosed to any other user through the friend matching and meeting-up management system of this invention.

In the friend selecting portion, the registered user E could input requirements for the expected object, such as age, sex, interests etc, and/or the expected time, site for dating etc, and other limiting requirements, and submit those requirements to the management server of the friend matching and meeting-up management system of this invention; then, the system manager searches in all the registered users and chooses one or several users F for the user E to further select or confirm based on the user's selected requirements and preset or included conditions, such as users' ranking, grades etc, in the system; after confirmation by the user E, the friend matching and meeting-up management system simultaneously or sequentially notifies the users F of "someone is expecting to contact him/her", waits for the feedback from the users F, and notifies the user E of those users F agreeing on this friend making, thus completing the friend selecting process. After the user confirms the next date, the system manager could take off or freeze the user's part points as agency fee and/or cash pledge, and the part or whole of the agency fee and/or cash pledge would be returned to the user after he/she confirms they have met successfully. During this friend selecting process, the users E or F could look over basic information, time schedule, site etc of the other party, but could not look over the other party or other users' contact methods. Also, in the above process, messages, such as asking something, amending date time, site and confirming making friends, could be transmitted through the system manager of the friend matching and meeting-up management system between the users E and F, and the users can not directly contact with each other.

The users expecting to meet contact through the friend matching and meeting-up management system without the risk of disclosing their contact methods before meeting, thus the safety is higher.

The meeting check-in portion comprises:

a meeting site portion, through which the system manager supervises and manages that at least two users arrive at their meeting site, and communicates with the users by communicators;

a meeting confirming portion, enabling said at least two users to utilize the communicators to make meeting confirmation to the system manager.

The whole meeting check-in process does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

The second embodiment of this invention relates to a friend matching and meeting-up management system.

The second embodiment is improved based on the first embodiment, and the main improvements are:

the meeting site portion further comprises:

a first information receiving and sending module, enabling said at least two users to communicate with the system manager;

a positioning module, through which the system manager inspects and/or verifies whether any one of the users has arrived at the meeting site.

The users expecting to meet contact through the friend matching and meeting-up management system without the risk of disclosing their contact methods before meeting, thus the safety is higher.

Figure 2:
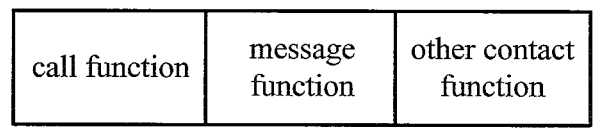
FIG. 2 is a schematic structure diagram of a chat block in the second embodiment of the invention.

The meeting site portion further comprises a chat block, enabling said any one of the users to directly contact with other users by utilizing his/her communicator. The chat block comprises a call function module, a message function module and other contact function module, as shown in FIG. 2. In convenience of finding the other party, a chat block is applied when users check in, which helps discover the other party in time at the meeting site so that the users can meet successfully.

The third embodiment relates to a friend matching and meeting-up management system.

The third embodiment is improved based on the first embodiment, and the main improvements are:

the meeting confirming portion further comprises:

a second information receiving and sending module, through which the system manager communicates with said at least two users and the information for meeting confirmation is transmitted among the system manager and said at least two users.

a confirming module, through which the system manager confirms whether the information for meeting confirmation sent by any one of the users is same as the information for meeting confirmation sent to the other users.

The whole meeting check-in process does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

The above process of confirming meeting to the system manager can be implemented by users respectively or by only one of the users. Then, the system manager could execute awarding and/or returning part or whole of the agency fee and/or cash pledge.

If the user appointed does not check in or confirm they have met successfully, the system manager deems it as breaking a promise and executes corresponding penalty.

Figure 3:
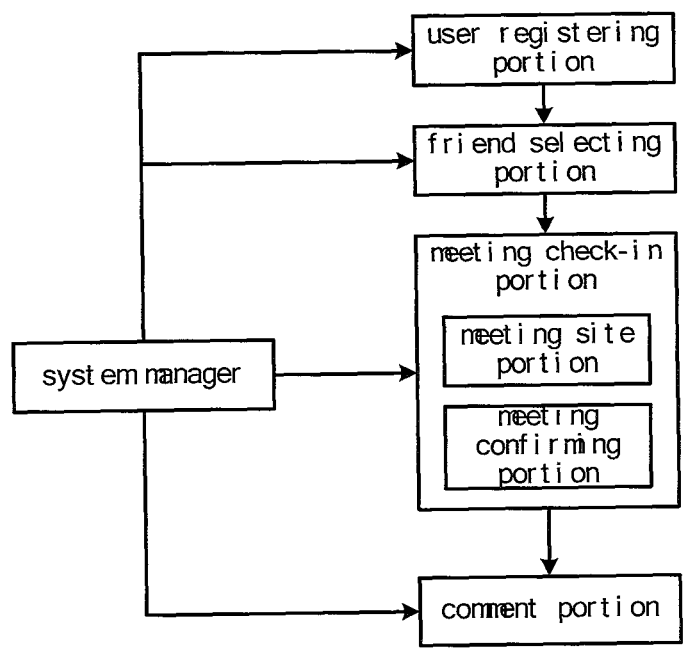
FIG. 3 is a schematic structure diagram of a friend matching and meeting-up management system in the third embodiment of the invention.

In addition, the friend matching and meeting-up management system further includes a comment portion, as shown in FIG. 3, wherein each user can reflect the feeling of this meeting to the system manager and comment on or mark the other party after meeting. These comments or marks can be utilized by the system manager to grade the other party or as a reference for those users who are ready to date with the graded user.

If the user feels pleasant during the meeting process, he/she can inform the other party of his/her own contact methods, or set the other party as his/her friend in the friend matching and meeting-up management system. And if the user is not satisfied during the meeting process, the other party can not obtain his/her contact methods to contact or disturb him/her, thus the safety of making friends increases.

It can be understood that the information for meeting confirmation sent to the users by the system manager can be QR Codes, or messages, or bar codes. Because communicators are widely installed with software applications of scanning, sending QR Codes, it is convenient and fast to utilize QR Codes as transmitted information to implement the meeting confirming process.

The fourth embodiment of this invention relates to a friend matching and meeting-up management system.

The fourth embodiment is improved based on the above three embodiments, and the main improvements are:

The system manager utilizes GPS technology, or WIFI hot technology, or social positioning technology of mobile communication to inspect and/or verify whether said any one of the users has arrived at the meeting site. The system manager utilizes GPS positioning technology, the range of application will be as wide as GPS, i.e. anywhere in the world. Anyone who possesses a communicator equipped with the GPS positioning device and wants to meet new people will be a target client. The service will not have any time or place constraints, for example, a flight attendant H can fill out his/her schedule, including the time and the city he/she will be at, according to his/her flight schedule, the flight attendant H will be matched with people that will be available at that time and place.

Further, communicators could be mobile communicators, such as smart phones or other portable communicators. Any person who possesses a mobile communicator can participate, and as long as the personal timetable, background and expectation of the object are input, the friend matching and meeting-up management system will send invitation and require confirmation according to match results, which is convenient and fast.

Further, communicators could also connect into the internet via wireless technology to communicate with the system manager.

The check-in function is formed by combining positioning technology and information transmitting technology based on smart phones and mobile communication technology, or the Internet and wireless technology, which brings people together to meet in person, beyond the virtual world, breaks down barriers and narrows the distance between people.

It should be explained that the units disclosed in the system embodiments of this invention are logic units, physically, a logic unit can be a physical unit, or a portion of a physical unit, or implemented in combination of several physical units, and physical implementing methods for these logic units themselves are not the most important, instead, the combination of the functions achieved by these logic units is the key to the technical problem to be solved in this invention. In addition, for highlighting creative portion of this invention, the above system embodiments of this invention do not introduce the units which are not related closely to the technical problem to be solved in this invention, which does not indicate that the above system embodiments do not include other units.

Figure 4:
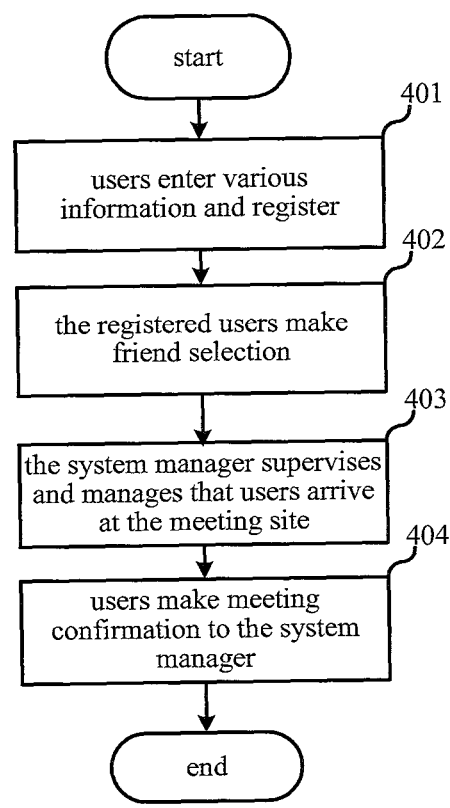
FIG. 4 is a flowchart of an operation method for a friend matching and meeting-up management system in the fifth embodiment of the invention.

The fifth embodiment of this invention relates to an operation method for the friend matching and meeting-up management system. FIG. 4 is a flowchart of the operation method for the friend matching and meeting-up management system. The operation method comprises the following steps:

In step 401, users enter various information via a user register portion to a system manager and register.

Then it enters into step 402, via a friend selecting portion, the registered users input requirements for the expected object to the system manager, then the system manager chooses one or several users for the registered users to select or confirm until at least two users agree on making friends with each other.

Then it enters into step 403, via a meeting site portion, the system manager supervises and manages that at least two users arrive at their meeting site and communicates with the users by communicators.

Then it enters into step 404, said at least two users utilize the communicators to make meeting confirmation to the system manager via a meeting confirming portion.

Then the flow ends.

The users expecting to meet contact through the friend matching and meeting-up management system without the risk of disclosing their contact methods before meeting, and the whole meeting check-in process also does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

The first embodiment is the system embodiment corresponding to this embodiment, and this embodiment and the first embodiment can be implemented in cooperation with each other. Correlated technical details disclosed in the first embodiment are still effective in this embodiment and will not be repeated here. Correspondingly, correlated technical details disclosed in this embodiment can also be applied in the first embodiment.

The sixth embodiment of this invention relates to an operation method for the friend matching and meeting-up management system. The sixth embodiment is improved based on the fifth embodiment.

The meeting site portion comprises a first information receiving and sending module and a positioning module.

Figure 5:
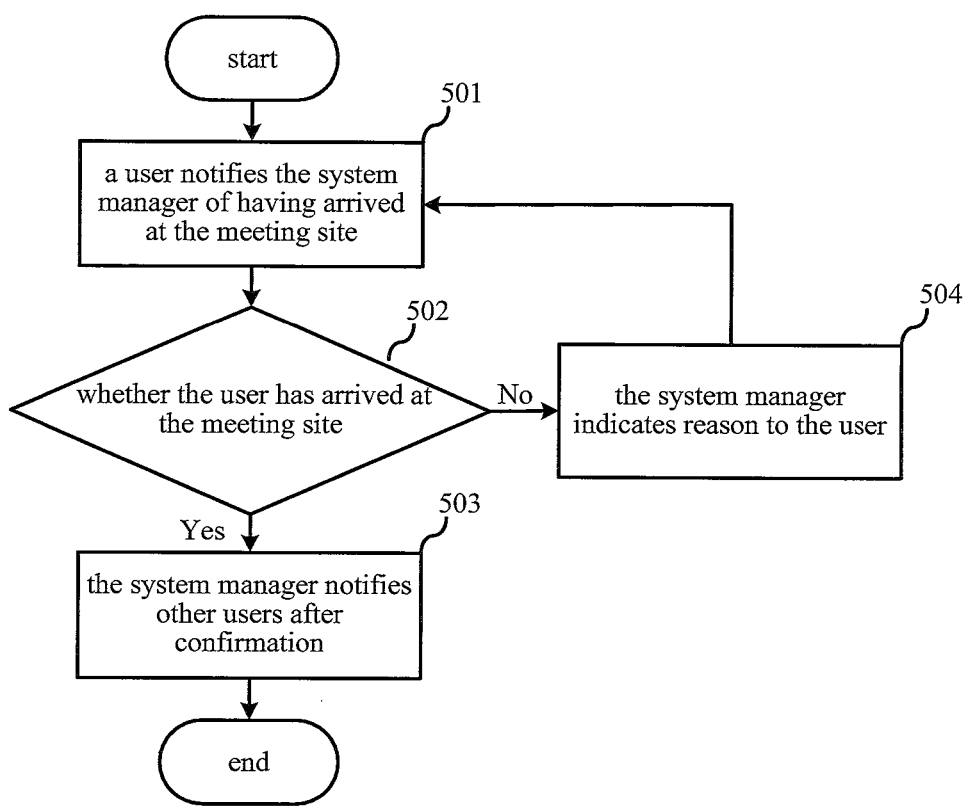
FIG. 5 is a flowchart of an operation method for a friend matching and meeting-up management system in the sixth embodiment of the invention.

As shown in FIG. 5, step 403 further comprises the following steps:

In step 501, any one of the users notifies the system manager of having arrived at the meeting site via the first information receiving and sending module, when he/she arrives at the meeting site at or before the predetermined time, after said at least two users agree on meeting at certain time and certain site.

Then it enters into step 502, the system manager inspects and/or verifies whether said any one of the users has arrived at the meeting site via the positioning module, if it is, then entering into step 503, if not, then entering into step 504.

In step 503, the system manager notifies other users via the first information receiving and sending module, after confirming said any one of the users has arrived at the meeting site.

Then the flow ends.

In step 504, the system manager indicates reason for not arriving at the meeting site to said any one of the users via the first information receiving and sending module, then returning to step 501.

After the step 503, the operation method further comprises the following step:

said any one of the users identifies and finds other users, if he/she does not meet other users, said any one of the users notifies the system manager of the case via the first information receiving and sending module, and the system manager executes corresponding penalty.

The users expecting to meet contact through the friend matching and meeting-up management system without the risk of disclosing their contact methods before meeting, thus the safety is higher.

The meeting site portion further comprises a chat block.

After the step 503, the operation method further comprises the following step:

the system manager initiates the chat block, and said any one of the users directly contact with other users via the chat block.

In convenience of finding the other party, a chat block is applied when users check in, which helps discover the other party in time at the meeting site so that the users can meet successfully.

The second embodiment is the system embodiment corresponding to this embodiment, and this embodiment and the second embodiment can be implemented in cooperation with each other. Correlated technical details disclosed in the second embodiment are still effective in this embodiment and will not be repeated here. Correspondingly, correlated technical details disclosed in this embodiment can also be applied in the second embodiment.

The seventh embodiment of this invention relates to an operation method for the friend matching and meeting-up management system. The seventh embodiment is improved based on the fifth embodiment.

The meeting confirming portion comprises a second information receiving and sending module and a confirming module.

Figure 6:
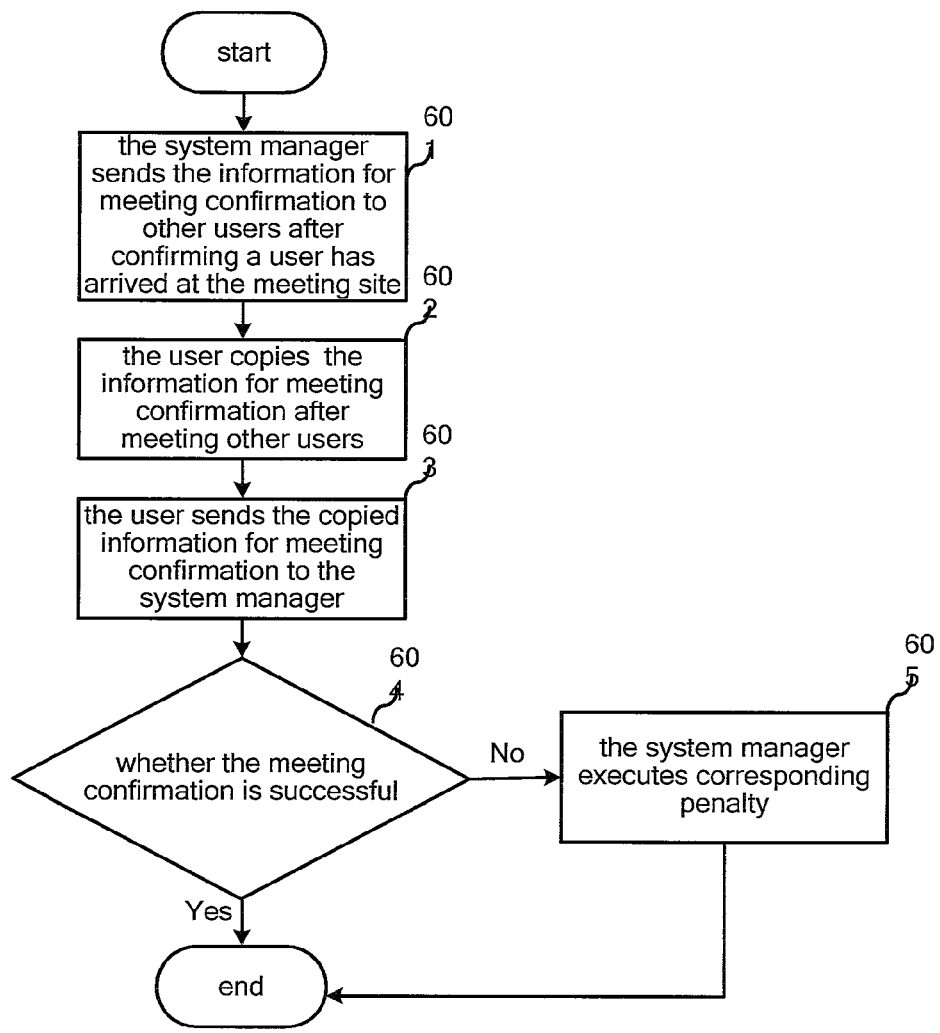
FIG. 6 is a flowchart of an operation method for a friend matching and meeting-up management system in the seventh embodiment of the invention.

As shown in FIG. 6, step 404 further comprises the following steps:

In step 601, the system manager sends the information for meeting confirmation to other users via the second information receiving and sending module, after the system manager confirms any one of the users has arrived at the meeting site.

Then it enters into step 602, after meeting other users, said any one of the users copies or inputs the information for meeting confirmation, which is received by other users, into his/her communicator.

Then it enters into step 603, said any one of the users sends the information for meeting confirmation, which is transmitted from other users to said any one of the users, to the system manager via the second information receiving and sending module.

Then it enters into step 604, the system manager confirms whether the information for meeting confirmation sent by any one of the users is same as the information for meeting confirmation sent to the other users via the confirming module, if it is, then it is confirmed that said any one of the users meets the other users successfully, then the flow ends, if not, then entering into step 605.

In step 605, the system manager executes corresponding penalty.

Then the flow ends.

The whole meeting check-in process does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

It can be understood that the information for meeting confirmation sent to the users by the system manager can be QR Codes, or messages, or bar codes. Because communicators are widely installed with software applications of scanning, sending QR Codes, it is convenient and fast to utilize QR Codes as transmitted information to implement the meeting confirming process.

Figure 7:
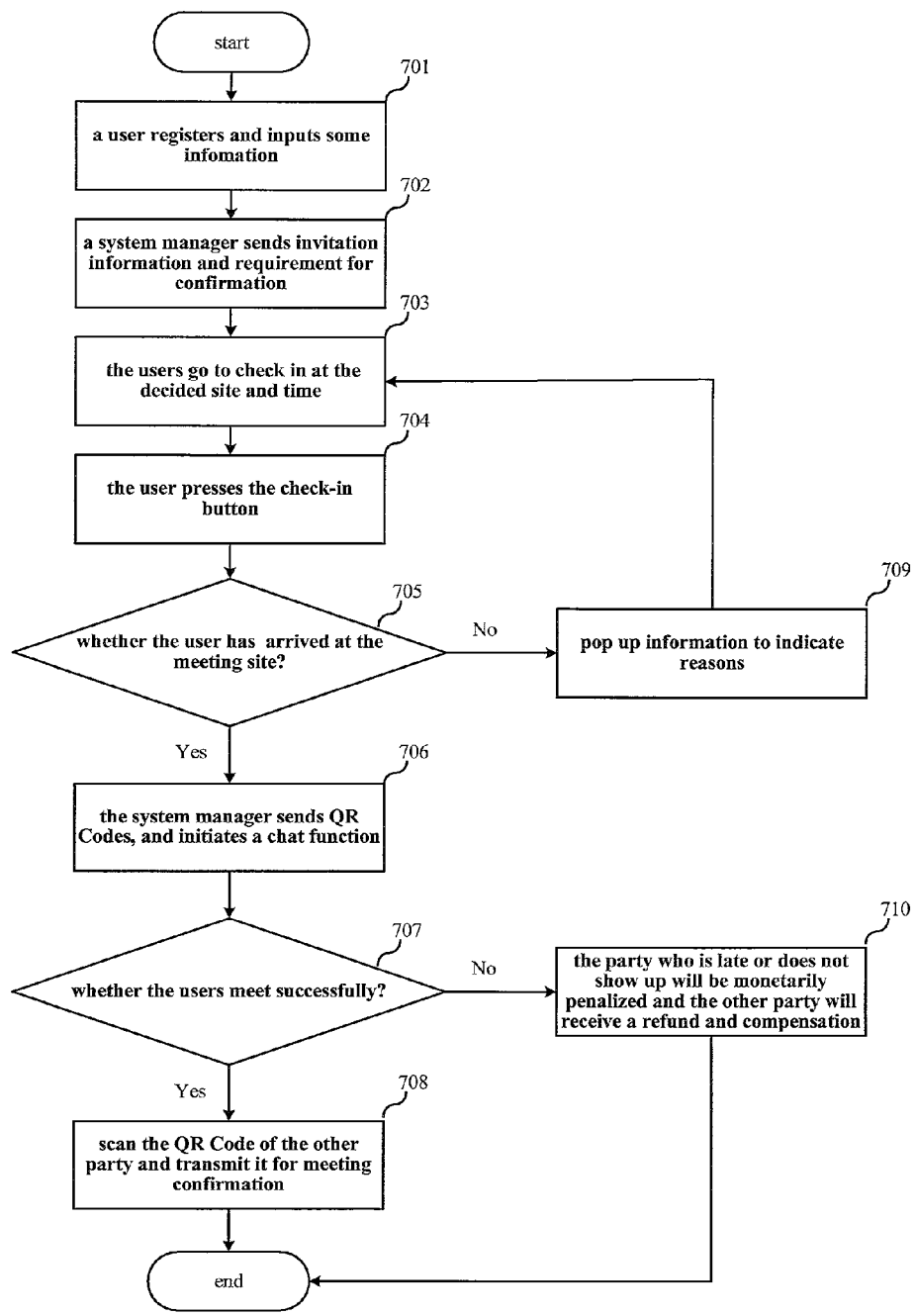
FIG. 7 is a flowchart for operating a friend matching and meeting-up management system in the seventh embodiment of the invention.
Figure 8:
FIG. 8 is a schematic diagram of user interfaces for a friend matching and meeting-up management system in the seventh embodiment of the invention.
Figure 9:
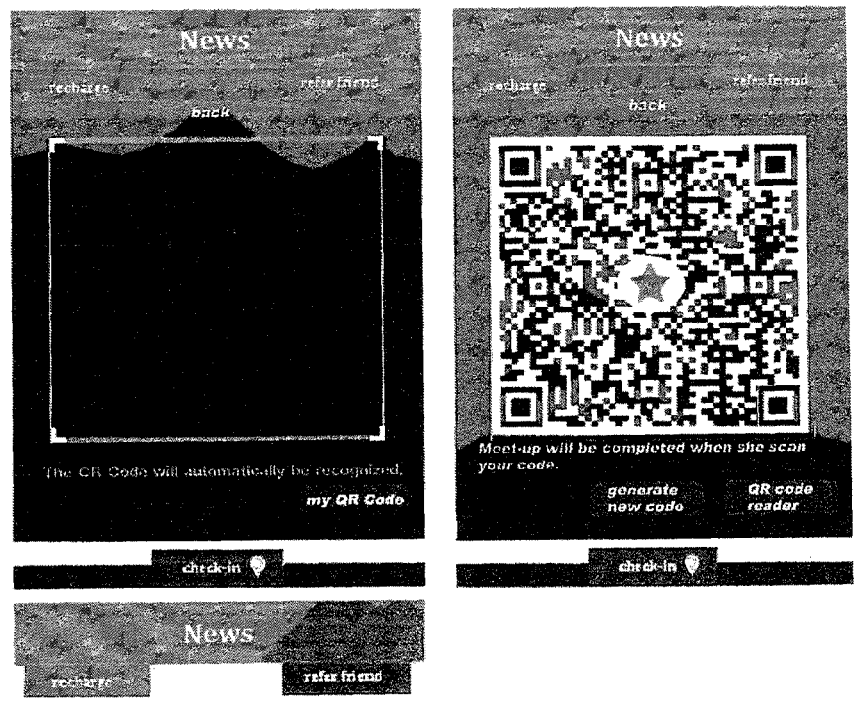
FIG. 9 is a schematic diagram of user interfaces for a friend matching and meeting-up management system in the seventh embodiment of the invention.
Figure 9:
Figure 9:

FIG. 7 is a flowchart for operating the friend matching and meeting-up management system. FIG. 8 and FIG. 9 are schematic diagrams of the application's interfaces in the users' communicators when the users check in and confirm meeting.

In a preferred embodiment of this invention, a process from registering to meeting for the friend matching and meeting-up management system is shown in FIG. 7, which comprises the following steps:

In step 701, a user registers and inputs personal time schedule, background, expectations for the object.

Then it enters into step 702, a system manager sends invitation information and requirement for confirmation based on match results.

Then it enters into step 703, after both parties confirm meeting, the users go to check in at the decided site and time.

Then it enters into step 704, after the user arrived, he/she presses the check-in button of the application in their mobile phones (corresponding to communicators).

It can be understood that in the other embodiments of this invention, communicators can also be computers and PDA (personal digital assistant). Preferably, in this embodiment, the communicators are mobile phones.

Then it enters into step 705, the system manager utilizes GPS technology to inspect and verify whether the user has arrived at the meeting site through the positioning device in his/her communicator, if it is, then entering into step 706, if not, then entering into step 709.

It can be understood that in the other embodiments of this invention, WIFI hot technology, or social positioning technology of mobile communication can also be utilized to inspect and verify whether the user has arrived at the meeting site. Preferably, in this embodiment, the positioning technology is GPS.

In step 706, the system manager sends QR Codes (Quick Response Code), and initiates a chat function through which the users can identify and find each other.

It can be understood that in the other embodiments of this invention, the system manager can also send messages or bar codes etc. Preferably, in this embodiment, the system manager sends QR Codes.

In addition, the above QR Codes for meeting confirmation can also be sent to the users by the system manager after they meet.

Then it enters into step 707, whether the users meet successfully, if it is, then entering into step 708, if not, then entering into step 710.

In step 708, the user scans the QR Code of the other party via the QR Code Reader in his/her mobile phone's applications, and transmits it to the system manager for confirming they have met successfully.

It can be understood that the above process of confirming meeting to the system manager could be implemented by two users respectively or by only one of the two users.

Then the flow ends.

In step 709, the system manager pops up information in the user's mobile phone, indicating the reason for his/her not arriving at the meeting site correctly, e.g., be early, be late, or the site is not correct etc. Then it returns to step 703.

In step 710, if one of the parties is late or does not show up, he/she will be monetarily penalized and the other party will receive a refund and compensation that is equal to the former's monetary penalty. This prevents the person being stood up from being taken advantage of.

Then the flow ends.

It can be understood that in the other embodiments of this invention, the number of people appointed can be two or above two.

The invention has for the first time combined QR Code and GPS to create a check-in system that will serve the World in the forms of an iPhone and Android app. Since smart phones have GPS capabilities, the system's apps will be able to use this to verify the location. The QR Code (Quick Response code), originally used in the production of Toyota's automobiles, has recently been commercialized in different industries. When users meet, they can use the QR Code Reader to confirm they have successfully met. Similar to Facebook, every user will have their own system web pages. The user's page can only be seen by people they've met, leaving little possibility of putting up false background information.

The third embodiment is the system embodiment corresponding to this embodiment, and this embodiment and the third embodiment can be implemented in cooperation with each other. Correlated technical details disclosed in the third embodiment are still effective in this embodiment and will not be repeated here. Correspondingly, correlated technical details disclosed in this embodiment can also be applied in the third embodiment.

The eighth embodiment of this invention relates to an operation method for the friend matching and meeting-up management system The eighth and the seventh embodiments are basically same, and the distinctions mainly are:

In the seventh embodiment, as shown in FIG. 6, step 404 further comprises the following steps:

the system manager sends the information for meeting confirmation to other users via the second information receiving and sending module, after the system manager confirms any one of the users has arrived at the meeting site;

after meeting other users, said any one of the users copies or inputs the information for meeting confirmation, which is received by other users, into his/her communicator;

said any one of the users sends the information for meeting confirmation, which is transmitted from other users to said any one of the users, to the system manager via the second information receiving and sending module;

the system manager confirms whether the information for meeting confirmation sent by any one of the users is same as the information for meeting confirmation sent to the other users via the confirming module, if it is, then it is confirmed that said any one of the users meets the other users successfully, if not, then the system manager executes corresponding penalty.

Figure 10:
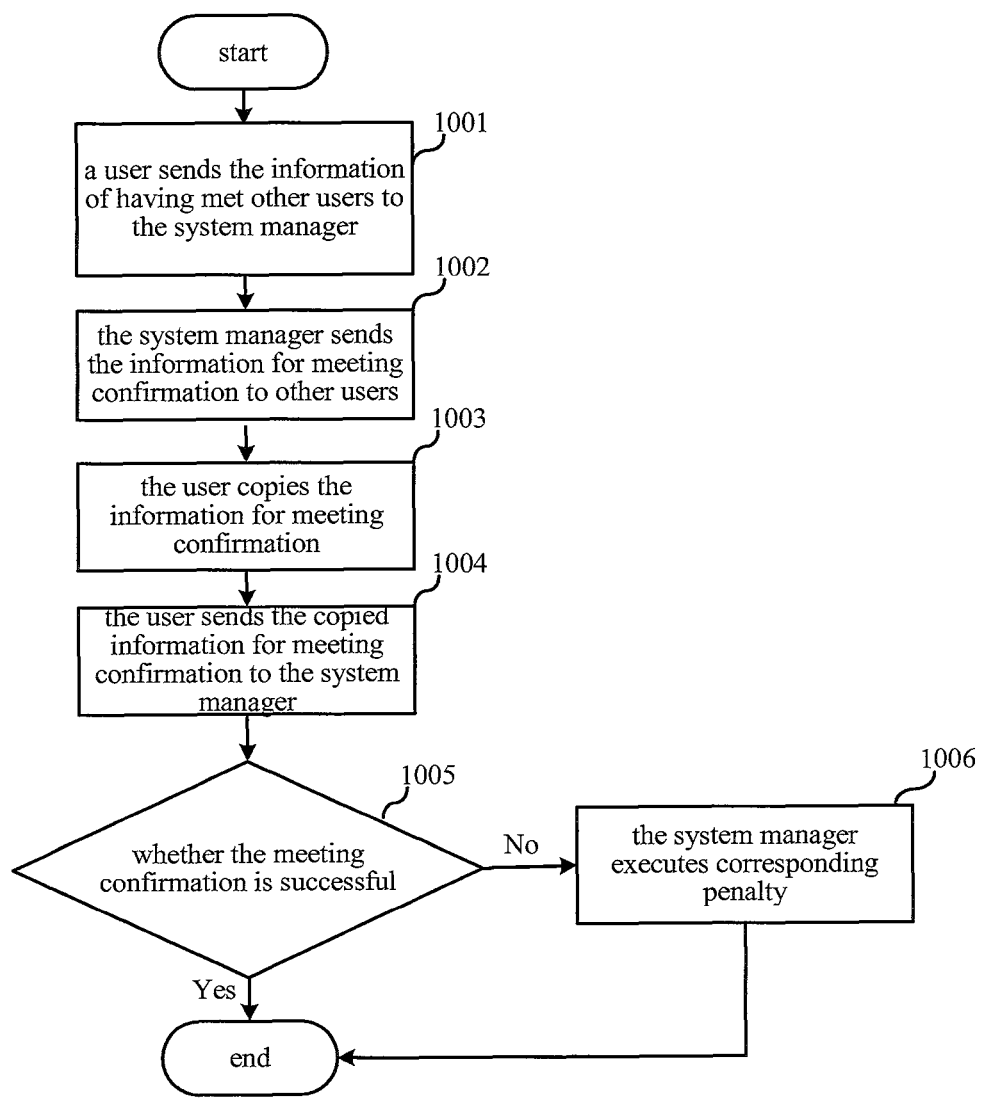
FIG. 10 is a flowchart of an operation method for a friend matching and meeting-up management system in the ninth embodiment of the invention.

While in the eighth embodiment, it describes in detail:

As shown in FIG. 10, step 404 further comprises the following steps:

In step 1001, any one of the users sends the information of having met other users to the system manager via the second information receiving and sending module after meeting other users.

Then it enters into step 1002, the system manager sends the information for meeting confirmation to other users via the second information receiving and sending module, after said any one of the users sends the information of having met other users to the system manager.

Then it enters into step 1003, said any one of the users copies or inputs the information for meeting confirmation, which is received by other users, into his/her communicator.

Then it enters into step 1004, said any one of the users sends the information for meeting confirmation, which is transmitted from other users to said any one of the users, to the system manager via the second information receiving and sending module;

Then it enters into step 1005, the system manager confirms whether the information for meeting confirmation sent by any one of the users is same as the information for meeting confirmation sent to the other users via the confirming module, if it is, then it is confirmed that said any one of the users meets the other users successfully, then the flow ends, if not, then entering into step 1006.

In step 1006, the system manager executes corresponding penalty.

Then the flow ends.

The whole meeting check-in process does not disclose any party's personal information such as email address and telephone number so as to protect the privacy of all, thus the safety is higher. In addition, in this invention, the friend matching and meeting-up management system can assist and manage the meeting process of users expecting to meet after the object is determined, and help ensure that the users can meet successfully. And because the friend matching and meeting-up management system is only required to manipulate backstage with no need of whole process company of people during the users' meeting process, a lot of people and material resources are saved.

The third embodiment is the system embodiment corresponding to this embodiment, and this embodiment and the third embodiment can be implemented in cooperation with each other. Correlated technical details disclosed in the third embodiment are still effective in this embodiment and will not be repeated here. Correspondingly, correlated technical details disclosed in this embodiment can also be applied in the third embodiment.

The ninth embodiment of this invention relates to an operation method for the friend matching and meeting-up management system. The ninth embodiment is improved based on the previous four method embodiments, and the main improvement is:

The system manager utilizes GPS technology, or WIFI hot technology, or social positioning technology of mobile communication to inspect and/or verify whether said any one of the users has arrived at the meeting site. The system manager utilizes GPS positioning technology, the range of application will be as wide as GPS, i.e. anywhere in the world. Anyone who possesses a communicator equipped with the GPS positioning device and wants to meet new people will be a target client. The service will not have any time or place constraints.

The fourth embodiment is the system embodiment corresponding to this embodiment, and this embodiment and the fourth embodiment can be implemented in cooperation with each other. Correlated technical details disclosed in the fourth embodiment are still effective in this embodiment and will not be repeated here. Correspondingly, correlated technical details disclosed in this embodiment can also be applied in the fourth embodiment.

The method embodiments of this invention all can be implemented by software, hardware and firmware etc. No matter this invention is implemented by software, or hardware, or firmware, instruction codes all can be stored in the memory (such as permanent or revisable, volatile or non-volatile, solid or non solid, fixed or exchangeable media etc) that any type of computers can access. Likewise, the memory can be such as programmable array logic, random access memory, programmable read only memory, read-only memory, electrically erasable programmable ROM, disc, light disc, and digital versatile disc etc.

It should be explained that in the Claims and Description of this invention, relationship terms such as first, second etc are just utilized to distinguish one entity or manipulation from another entity or manipulation, instead of requiring or indicating any practical relation or sequence existing between these entities or manipulations. And, the terms "include", "contain" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include one" does not exclude additional same elements existing in the process, method, article or equipment of this element.

By referring to some preferred embodiments, this invention has been illustrated and described. But it should be understood to those skilled in the art that various other changes in the forms and details may be made without departing from the principles and scope of the invention.

What is claimed is:

1. A friend matching and meeting-up management system, including a user registering portion, a friend selecting portion, a meeting check-in portion and a system manager, wherein said system manager controls and manages various portions to implement a friend matching and meeting-up management process;
    said meeting check-in portion comprises:
    a meeting site portion, through which said system manager supervises and manages that at least two users arrive at their meeting site, and communicates with the users by communicators;
    a meeting confirming portion, enabling said at least two users to utilize the communicators to make meeting confirmation to said system manager;
    a user confirming portion, enabling the system manager to inspect and/or verify whether said any one of the users has arrived at the meeting site portion via a positioning module, if not, said system manager indicates reason for not arriving at the meeting said to said any one of the users via a first information receiving and sending module.

2. The friend matching and meeting-up management system according to claim 1, wherein said at least two users contact through the friend matching and meeting-up management system before meeting.

3. The friend matching and meeting-up management system according to claim 1, wherein said meeting site portion further comprises:
    a first information receiving and sending module, enabling said at least two users to communicate with said system manager;

a positioning module, through which said system manager inspects and/or verifies whether any one of the users has arrived at the meeting site.

4. The friend matching and meeting-up management system according to claim 3, wherein said meeting site portion further comprises a chat block, enabling said any one of the users to directly contact with other users by utilizing his/her communicator.

5. The friend matching and meeting-up management system according to claim 4, wherein said chat block comprises a call function module, a message function module and other contact function module.

6. The friend matching and meeting-up management system according to any one of claims 1-5, wherein said system manager utilizes GPS technology, or WIFI hot technology, or social positioning technology of mobile communication to inspect and/or verify whether any one of the users has arrived at the meeting site.

7. The friend matching and meeting-up management system according to claim 1, wherein said meeting confirming portion further comprises:
a second information receiving and sending module, through which said system manager communicates with said at least two users and the information for meeting confirmation is transmitted among said system manager and said at least two users;
a confirming module, through which said system manager confirms whether the information for meeting confirmation sent by any one of the users is same as the information for meeting confirmation sent to the other users.

8. The friend matching and meeting-up management system according to claim 7, wherein said information for meeting confirmation includes QR Codes, or messages, or bar codes.

9. The friend matching and meeting-up management system according to claim 1, wherein said communicators includes mobile communicators.

10. The friend matching and meeting-up management system according to claim 9, wherein said mobile communicators include smart phones, or other portable communicators.

11. The friend matching and meeting-up management system according to claim 1, wherein said communicators connect into the internet via wireless technology to communicate with said system manager.

12. An operation method for said friend matching and meeting-up management system, wherein said operation method comprises the following steps:
user register step, in which users enter various information via a user register portion to a system manager and register;
friend selection step, in which via a friend selecting portion, the registered users input requirements for the expected object to said system manager, then said system manager chooses one or several users for the registered users to select or confirm until at least two users agree on making friends with each other;
meeting site step, in which via a meeting site portion, said system manager supervises and manages that said at least two users arrive at their meeting site, and communicates with the users by communicators;
meeting confirming step, in which said at least two users utilize the communicators to make meeting confirmation to said system manager via a meeting confirming portion;
user confirming step, in which said system manager inspects and/or verifies whether any one of the users has arrived at the meeting site via a positioning module, if not, said system manager indicates reason for not arriving at the meeting site to said any one of the users via a first information receiving and sending module.

13. The operation method for said friend matching and meeting-up management system according to claim 12, wherein said at least two users contact through the friend matching and meeting-up management system before meeting.

14. The operation method for said friend matching and meeting-up management system according to claim 12, said meeting site portion comprises a first information receiving and sending module and a positioning module, wherein said meeting site step further comprises the following steps: any one of the users notifying said system manager of having arrived at the meeting site via said first information receiving and sending module, when he/she arrives at the meeting site at or before the predetermined time, after said at least two users agree on meeting at certain time and certain site;
said system manager notifying other users via said first information receiving and sending module, after confirming said any one of the users has arrived at the meeting site.

15. The operation method for said friend matching and meeting-up management system according to claim 14, wherein after said step of said system manager notifying other users via said first information receiving and sending module, after confirming said any one of the users has arrived at the meeting site, said operation method further comprises the following step:
said any one of the users identifying and finding other users, if he/she does not meet other users, said any one of the users notifies said system manager of the case via said first information receiving and sending module, and said system manager executes corresponding penalty.

16. The operation method for said friend matching and meeting-up management system according to claim 14, said meeting site portion further comprises a chat block, wherein after said step of said system manager notifying other users via said first information receiving and sending module, after confirming said any one of the users has arrived at the meeting site, said operation method further comprises the following step:
said system manager initiating said chat block, and said any one of the users directly contacting with other users via said chat block.

17. The operation method for said friend matching and meeting-up management system according to claim 12, said meeting confirming portion comprises a second information receiving and sending module and a confirming module, wherein said meeting confirming step further comprises the following steps:
said system manager sending the information for meeting confirmation to other users via said second information receiving and sending module, after said system manager confirms any one of the users has arrived at the meeting site;
after meeting other users, said any one of the users copying or inputting the information for meeting confirmation, which is received by other users, into his/her communicator;
said any one of the users sending the information for meeting confirmation, which is transmitted from other users to said any one of the users, to said system manager via said second information receiving and sending module;
said system manager confirming whether the information for meeting confirmation sent by any one of the users is same as the information for meeting confirmation sent to the other users via said confirming module, if it is, then it is confirmed that said any one of the users meets the other users successfully.

18. The operation method for said friend matching and meeting-up management system according to claim 17, wherein said information for meeting confirmation includes QR Codes, or messages, or bar codes.

19. The operation method for said friend matching and meeting-up management system according to claim 12, said meeting confirming portion comprises a second information receiving and sending module and a confirming module, wherein said meeting confirming step further comprises the following steps:

any one of the users sending the information of having met other users to said system manager via said second information receiving and sending module after meeting other users;

said system manager sending the information for meeting confirmation to other users via said second information receiving and sending module, after said any one of the users sends the information of having met other users to said system manager;

said any one of the users copying or inputting the information for meeting confirmation, which is received by other users, into his/her communicator;

said any one of the users sending the information for meeting confirmation, which is transmitted from other users to said any one of the users, to said system manager via said second information receiving and sending module;

said system manager confirming whether the information for meeting confirmation sent by any one of the users is same as the information for meeting confirmation sent to the other users via said confirming module, if it is, then it is confirmed that said any one of the users meets the other users successfully.

20. The operation method for said friend matching and meeting-up management system according to claim 12, wherein said system manager utilizes GPS technology, or WIFI hot technology, or social positioning technology of mobile communication to inspect and/or verify whether any one of the users has arrived at the meeting site.

* * * * *